United States Patent [19]

Kellar et al.

[11] Patent Number: 4,774,583
[45] Date of Patent: Sep. 27, 1988

[54] VIDEO SIGNAL PROCESSING SYSTEMS

[75] Inventors: Paul R. N. Kellar, Newbury; Robin A. Cawley, Ball Hill; Neil R. Hinson, Newbury, all of Great Britain

[73] Assignee: Quantel Limited, Newbury, United Kingdom

[21] Appl. No.: 698,802

[22] Filed: Feb. 6, 1985

[30] Foreign Application Priority Data

Mar. 7, 1984 [GB] United Kingdom ............... 8405947

[51] Int. Cl.⁴ ............................................. H04N 5/272
[52] U.S. Cl. ..................................... 358/183; 358/22
[58] Field of Search ............... 358/181, 182, 183, 22, 358/185, 188

[56] References Cited

U.S. PATENT DOCUMENTS 4,266,242  5/1981  McCoy .............................. 358/22
4,360,831 11/1982  Kellar ............................... 358/182

FOREIGN PATENT DOCUMENTS 1585954  3/1981  United Kingdom .
2099269 12/1982  United Kingdom .

Primary Examiner—Tommy P. Chin
Attorney, Agent, or Firm—Cooper & Dunham

[57] ABSTRACT

A video signal processing system in which a number of video image signals are combined to provide an output which is such that where several objects of the input images overlay so they appear to be at different distances. Each input video signal is provided with a priority signal and a series of contests are held within the processor so that the final image consists of the two video signals with the highest priority. A key signal is provided for the video signal with the highest priority.

13 Claims, 5 Drawing Sheets

Fig. 1. SINGLE UNIT

Fig. 2. CASCADED SYSTEM

Fig. 3. SELECTOR UNIT

Fig. 4. COMBINER UNIT

VIDEO SIGNAL PROCESSING SYSTEMS

BACKGROUND OF THE INVENTION

This invention relates to video signal processing systems, in particular systems in which the processing is carried out on digital video signals.

Devices for processing digital video signals are widely used in television broadcasting and in other situations for producing special effects in pictures reproduced from the processed signals. Such devices are, for example, the digital production effects machines known as the DPE 5000, digital library systems such as the DLS 6000, or video generating systems such as the DPB 7000, all of which are articles of commerce manufactured by Quantel Limited of Kenley House, Kenley, Surrey, England.

OBJECT OF THE INVENTION

The object of the present invention is to provide a video signal processing system in which the outputs of a number of digital video devices each capable of generating an independent sequence of digital video signals representing an image can be combined in such a way as to provide a video signal output in which the image produced at points where several objects of the input images overlap is such that they appear to be at different distances from the screen.

SUMMARY OF THE INVENTION

According to the present invention there is provided a video signal processing system comprising a plurality of processing stages each capable of providing a sequence of digital video signals and associated priority signals relating to a respective image, a selector for each stage arranged to transmit to the next selector a plurality of sequences of digital video signals and priority signals selected from the group which consists of the video signals and priority signals parovided by the stage and then transmitted from the preceding selector, the selection of the video signals in the sequence being dependent upon the priority signals in the group, and means for combining the video signals transmitted to the last selector to produce a sequence of output video signals.

The initial selector has means for providing reference video and priority signals, in the place of video and priority signals which would otherwise be transmitted from a preceding selector: preferably moreover a sequence of key signals is provided in association with the sequences of video signals provided at each stage, and each selector is arranged to transmit to the next selector the key signals associated with the video signals of highest priority. The key signal is preferably such that when combining of video signals occurs, linear keying is achieved whereby one image object is made to overlap another of lower priority cleanly by generating an area at the edge of the top object in which the output signals are produced by mixing together the video signals representing the two images involved in proportions determined by the key signal. The use of key signals is described in our co-pending U.K. Patent Application No. 8300378, the disclosure of which is incorporated herein by reference. The image generated using key signals corresponds much more closely to the real world than those produced by switching sources between picture points.

BRIEF DESCRIPTION OF THE DRAWINGS

In order that the present invention may be more clearly understood and readily carried into effect, it will now be described more fully with reference to the accompanying drawings in which.

DESCRIPTION OF PREFERRED EMBODIMENHT

Each video device is assumed to produce as an output three sequences of digital signals timed by a common clock, namely, Video, Key, and Priority. The Video (marked V) represents the digitised image presented at a given selector, and may be in any color-separated format. For the remainder of this discussion a format consisting of 8 bits of luminance data (Y) and eight bits of alternating color difference data (U/V) is assumed. The Key (K) is a fractional signal in the range 0 to 1 which has the value 0 where the video image is maximum, and ramps smoothly between these values at the edges of the image. It is assumed for the purpose of this discussion to be an 8 bit binary fraction, though fewer bits are adequate for many applications. The Priority (P) is an arbitrary depth code designating the depth plane which the object is intended to occupy in the output image. The value 0 is assumed to be the lowest priority (most distant, or background, plane). The priority will be constant if the video provided by a particular device is intended to represent a single object. A generalisation to allow a single video device to generate video representing multiple objects or different depths is discussed below. The video device may be for example of a digital production effects machine DPE 5000. It will be understood that there is a digital Video, Key and Priority signal for each point in a frame of the image or picture.

The assumption made for this invention is that for any single point in the picture there is a maximum number of separate images which need to be keyed together to produce the desired output. For the purpose of the rest of this discussion that number is assumed to be two, though serialisation to a higher number is discussed below. The general mode of operation is that the two images to be combined are determined by a series of three way contests. From each contest a "winner" and a "runner-up" are decided, which pass on to the next contest. When all images have "competed" for a position, the final pair of images can then be keyed together to produce a final digital video output. The keying is, of course, carried out by operating on the respective digital video signals. This output may then be used by other digital devices of fed to a DAC to be reconverted to normal analog video.

Figure 1:
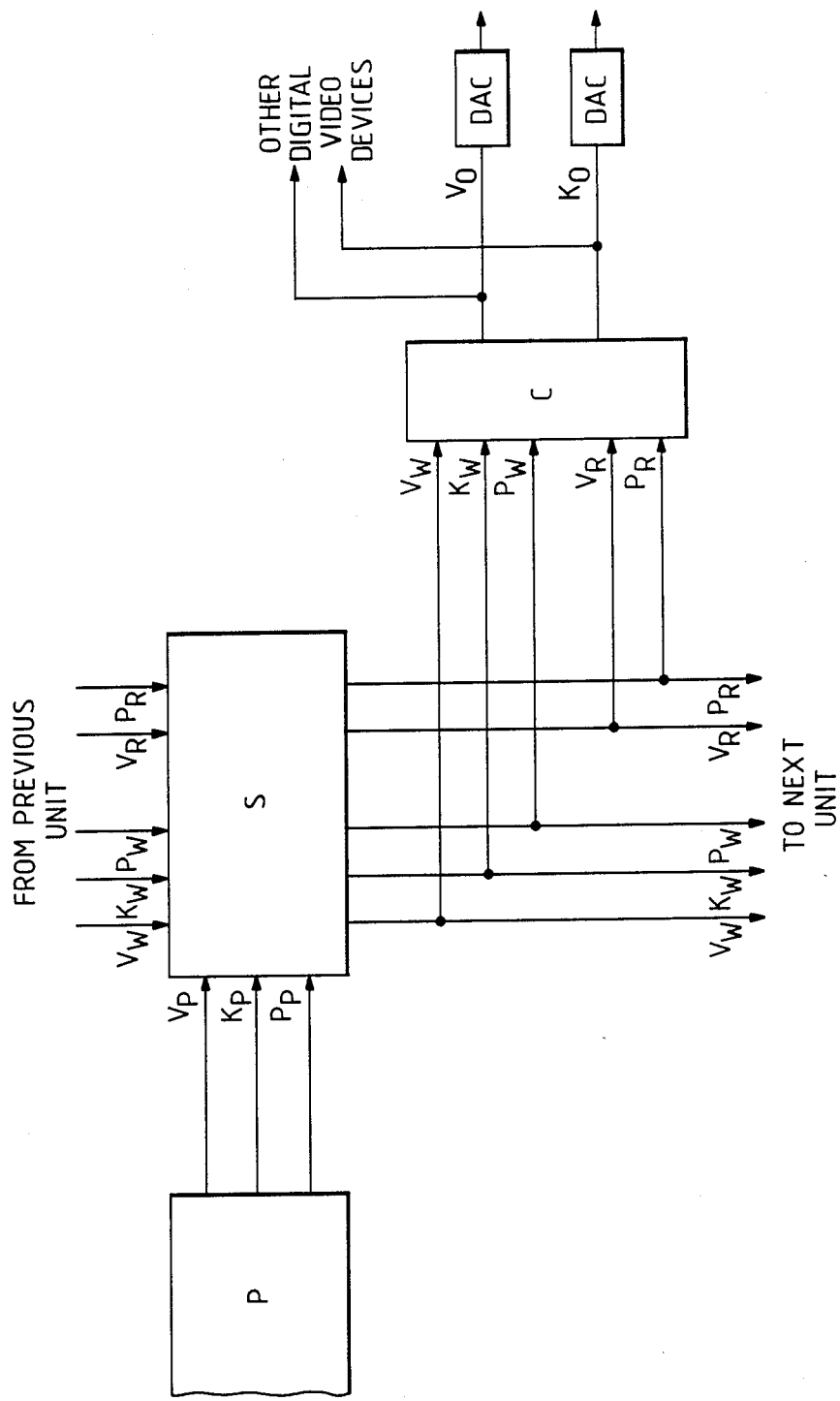
FIG. 1 illustrates one unit of a system according to one example of the invention, the unit comprising one processing stage, a selector and a combiner.
Figure 2:
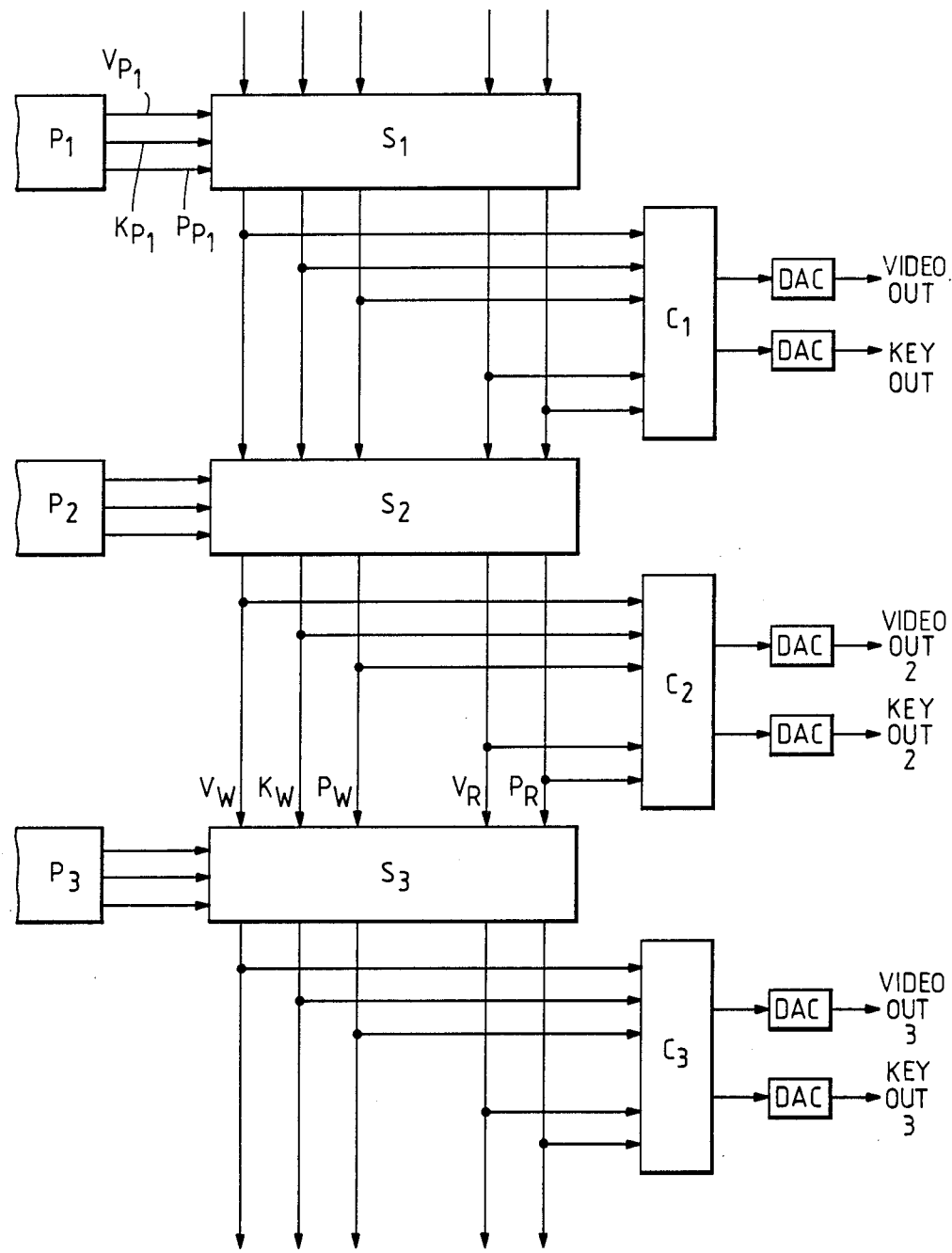
FIG. 2 illustrates a plurality of such units linked together to provide a system capable of producing a composite image.

In FIG. 1 the video processor P, for example DPE 5000, generates Video, Key and Priority signals Vp, Kp and Pp. These are fed into the selection unit S. Also fed into S are the cascaded outputs Vw, Vr, Pw, Pr, and Kw from the preceding stage. This unit then generates another set of outputs Vw (winner video), Vr (runner-up video), Pw (priority of winner), Pr (priority of runner up) and Kw (winner key) which can be passed on to successive stages. This output may also be tapped off into the combiner C, from which a combined digital output Vo with associated key signak Ko can be passed on to other devices such as a DAC. FIG. 2 shows several units linked together to produce a composite image. In this case, the combiner C is optional for all except the last stage.

Figure 3:
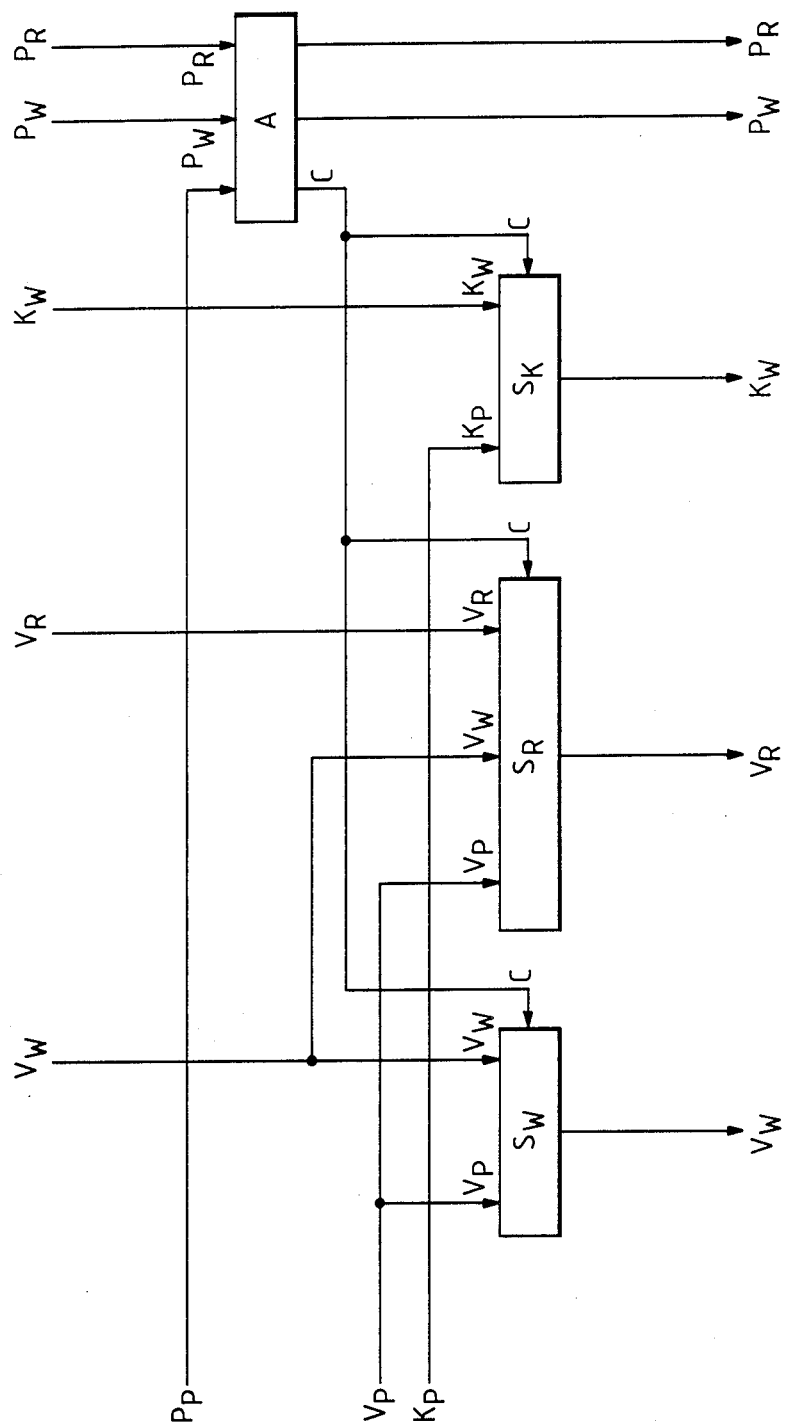
FIG. 3 illustrates the selector of FIG. 1 in greater detail.

FIG. 3 is a block diagram of the selector S. The three priority inputs are fed into an arbitrator A. This compares the three numeric values and generates the output Pw and Pr and also a selector control signal C. The arbitrator is implemented in this example by a look-up table, but it may be implemented by other forms of logic circuits. The signal C controls the operation of selectors, Sw, which selects between the inputs Vw and Vp, Sr which selects between Vw, Vr and Vp, and Sk which selects between Kw and Kp. A signal Z is generated from key input Kp, and is asserted only when Kp is exactly zero. When asserted, it forces all three selectors to the state where Sw selects Vw, Sr selects Vr and Sk selects Kw. This means that the cascaded inputs pass straight through if the input key is zero and therefore is to be ignored.

Otherwise the design of A is such that:
1. if $Pp > Pw$ then
   Sw selects Vp
   Sr selects Vw
   Sk selects Kp
2. if $Pw > Pp > Pr$ then
   SW selects VW
   Sr selects Vp
   Sk selects Kw
3. if $Pp < Pr$ then
   Sw selects Vw
   Sr selects Vr
   Sk selects Kw Case 1 occurs when the new channel has higher priority than both inputs and pre-empts the "winner" position and the winner becomes "runner-up". In this case its key also pre-empts the existing key. Case 2 occurs when the new channel "loses" to the winner but "beats" the runner up, in which case its video displaces the "runner-up" only, leaving the key (which is associated with the "winner") unchanged. Case 3 occurs when the new video "loses to" both inputs and is ignored.

It is impossible for Pr to be greater than Pw, and they can only be the same at the start of the chain, when they will both be zero. It is therefore necessary to be able to represent only half the possible combinations of priorities, in encoded format C. If arbitrator A is a look-up table, encoding and decoding are automatically performed by the table.

Figure 4:
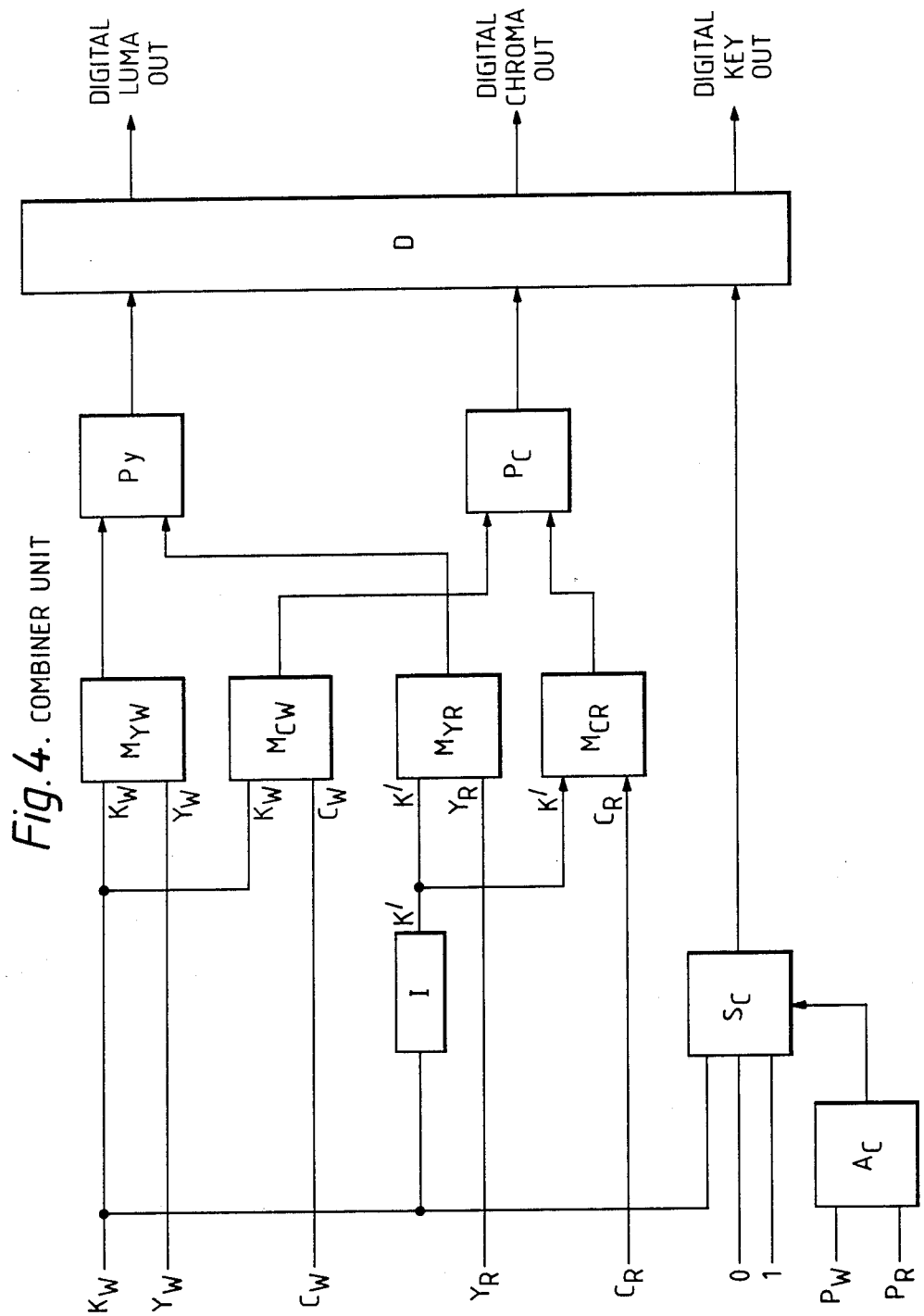
FIG. 4 illustrates a combiner in greater detail.

FIG. 4 is a block diagram of the combiner C in FIG. 1. The signals Vw and Vr are represented in this Figure as the luminance signals Yw, Yr and the chrominance signals Cw, Cr. The Key signal Kw is fed into multipliers Myw and Mcw to produce signals reduced in magnitude proportionally to the Key. Kw is also applied into an inverter I which produces an output K' representing 1-Kw. This is then used to multiply the runner up video in multipliers Myr and Mcr to reduce them proportionally to the inverse of the (winner) key. The luminance and chrominance signals are then separately summed in adders Py and Pc to produce output Video Y0 and C0. The priority signals Pr and Pw are fed into arbitrator Ac which generates a signal controlling a selector Sc such that:
1. if $Pw = 0$
   Sc selects 0
2. if $Pw > 0$, $Pr = 0$
   Sc selects Kw
3. if $Pw > 0$, $Pr > 0$
   Sc selects 1

The resultant output signals must be fed through a variable delay D if the outputs from the combiners are needed to be synchronous, since the successive stages will differ in timing by the amount of delay through each selector S.

Figure 5:
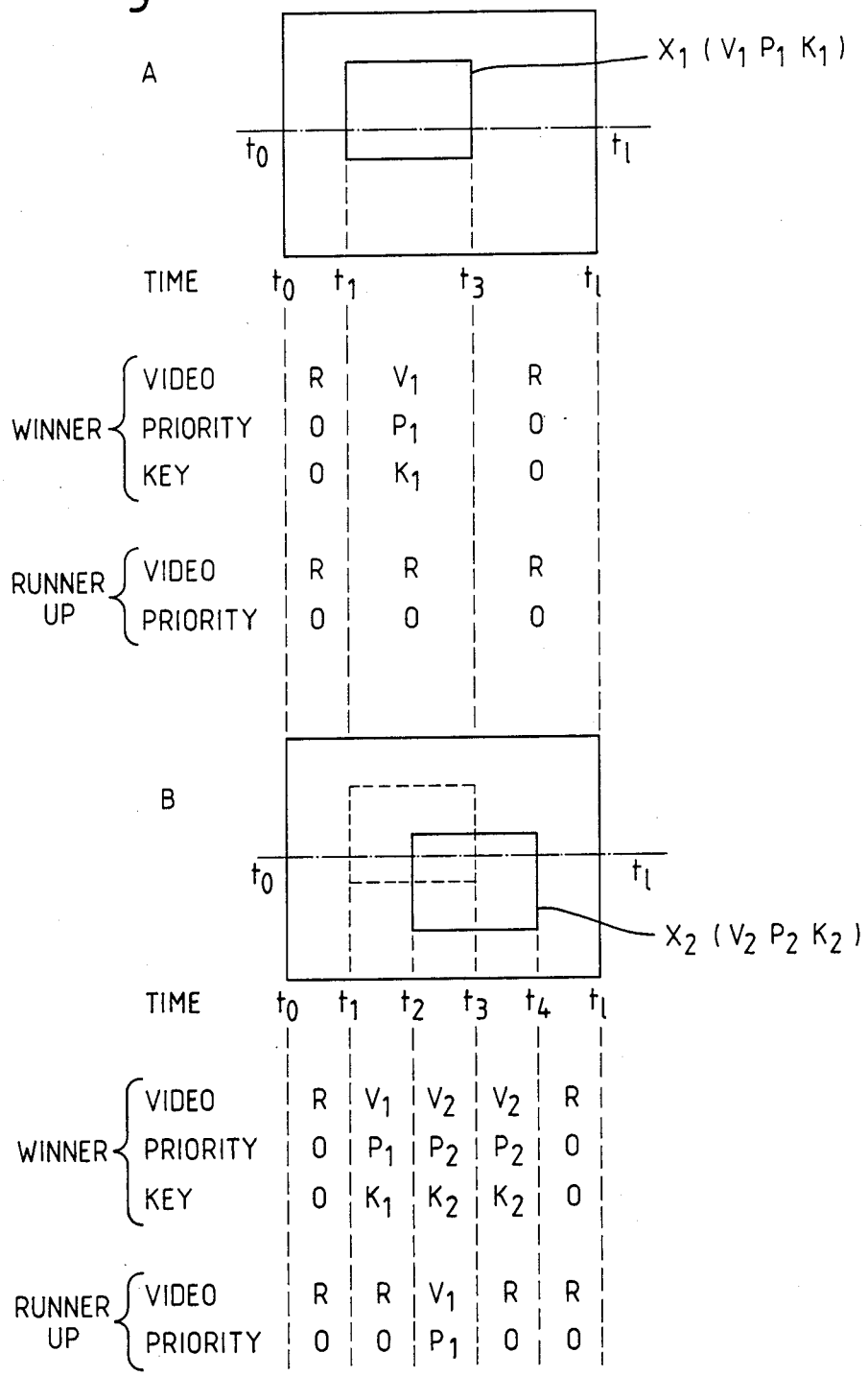
FIG. 5 comprises diagrams explanatory of the operation of FIG. 2.

In FIG. 2 the inputs at the top of the diagram are not connected. A referencing circuit is provided for the first selector S, to produce reference signals such that each $P_w$, $P_r$ and $K_w$ is zero, and both $V_w$ and $V_r$ represents a background or matte which will appear on the output wherever no video input has been inserted. This will usually be a flat color, though a background image could be used. If the equipment is designed so that such a matte can be used instead of the cascaded input at any of the stages, the system can be divided into groups of one or more adjacent stages which produce a correctly combined image independent of other groups. If the output at the bottom of FIG. 2 is connected to the input at the top such a group can "wrap around", increasing the flexibility of reconfiguration. However, it is necessary to designate one unit to have a matte input. In order to illustrate the operation of the system illustrated in FIGS. 2 to 4, assume that the Video provided by processor P, represents an image such as illustrated in FIG. 5A, comprising an object X, in a reference background. The video signals for picture points within the boundary of X, are denoted as V1 and those for picture points in the background are denoted as R. The priority is $P_1$ ($>0$) for the object X, and 0 for the background. The Key is $K_1$ for the object $X_1$ and 0 for the background. As already explained, the "winner" Video, Priority and key signals applied to the first selector $S_1$ are R 0 0 where R represents the background. The runner up Video and Priority signals are similarly R 0. The object $X_1$ may be, for example, a scene picked up by a television camera, but reduced in size and offset as depicted by the processor $P_1$. The Key signal $K_1$ will ramp from 0 at the boundary of $X_1$ through a marginal area to 1 over the remainder of the area of $X_1$.

Consider the signals output from the selector during a representative line period $t_0$ to $t_e$ represented in FIG. 5A. The three-way contest in the selector $S_1$ will leave the winner and runner up signals unchanged during the intervals $t_0$ $t_1$ and $t_3$ to $t_e$ but will insert the signals $V_1$ $P_1$ and $K_1$ in the winner positions during the interval $t_1$ to $t_3$, the runner up signals remaining at R 0. These results are shown below FIG. 5A.

Assume now that the Video provided by processor $P_2$ represents an image such as illustrated in FIG. 5B comprising an object $X_2$ in a reference background. The Video, Priority and Key for picture points within the boundary of $X_1$ are denoted as $V_2$ $P_2$ $K_2$, of which $P_2 > P_1$. For the background the corresponding signals are R 0 0. The three way contest in the selector $S_2$ between the winner and runner up inputs from $S_z$ and the "new" input from $P_2$ produces the results shown below FIG. 5b during the representative line period $t_0$ to $t_e$. The signals during other line periods can be deduced.

If the winner and runner up signals produced from $S_2$ are applied to the combiner $C_2$, consideration of the operation of FIG. 4 on the signals occurring during the line period $t_o$ to $t_e$ will reveal that the output of combiner will represent the object $X_2$ superimposed on $X_1$ where there is overlap, as indicated in FIG. 5B, and that linear keying is achieved.

If different processors P should provide respective video signals representing different but exactly overlapping objects which pre-empt the winner and runner up positions, the effect of the winner's Key, when combination takes place may produce an undesirable effect. This effect arises because the Key, in participating in the combination will add at the edges of the winning object a proportion of the runner up object which would not be otehrwise apparent in the combine picture. The effect can be avoided, however, by modification of the selectors in such a way as to block the selection of a new runner up and retain the old runner up at any picture points for which the Key for the winner and the Key for the potential runner up are both not zero and not 1, i.e. both are between 0 and 1.

Alternatively the selection may be blocked when the key for the winner is greater than or equal to the key for the potential runner up and both are not 1.

If more than two video inputs are required from a preceding selector, the design can be generalised for N video signals by adding more selectors in the selector unit S. For a design with N cascaded signals, N video and priority signals and N-1 key signals must be passed between units, and each unit will require N video selectors, the first having two inputs, the second three, and so on up to having 2 to N inputs.

If a processor P in FIG. 2 is to present M multiple image objects to the system it does not need to present M separate video, key and priority channels and to have M separate selectors S. Since only two video signals can be passed on to the next stage of processing, such a multi-object processor can be simplified to appear as two single object processors. Such a processor might be realised as two processor stages as drawn on FIG. 2. However, a simpler version may be arranged to produce only a single Video and Key with two priorities.

The invention may, of course, take a variety of other practical forms.

We claim:

1. A video signal processing system for combining a plurality of images comprising:
   a plurality of sources each of which provides video signals representing a respective image and priority signals for the respective image;
   a series of selector stages connected to each other and to the sources such that each selector stage in the series:
   (i) receives as its inputs said video signals and priority signals from a respective one of said sources and video signals and priority signals from a preceding selector stage, if any, in the series, and
   (ii) selects from among said inputs selected video signals and priority signals on the basis of the priority signals received as said inputs, and provides as its outputs the selected video signals and priority signals, and transmits said outputs to a next selector stage, if any, in the series; and
   means for combining the selected video signals provided as said outputs by the last selector stage in the series to produce output video signals, and wherein each said selector stage comprises means for selecting from among said inputs and for providing as its first and second outputs, the video signals which have the highest and the second highest priority signals but not video signals which have lower priority signals.

2. A video signal processing system as claimed in claim 1, further including means for providing reference video and priority signals as inputs to the initial selector stage in the series.

3. A video signal processing system as claimed in claim 1, further comprising means for providing, as inputs to the respective selector stages, key signals for the video signals representing the images provided by said sources.

4. A video signal processing system as claimed in claim 3, wherein each of said selector stages comprises means for including among its outputs the key signals for at least some of the video signals provided as outputs of that stage.

5. A video signal processing system as claimed in claim 4, further comprising means for transmitting from each of said selector stages to the next selector stage, if any, the key signals for the video signals having the highest priority signals.

6. A video signal processing system as claimed in claim 4, in which said means for combining selected video signals includes multipliers which multiply the key signals provided as said outputs of the last selector stage in the series and the inverse of said key signal by respective video signals which also are provided as outputs of said last stage.

7. A method of video signal processing for combining a plurality of video images comprising the steps of:
   providing a sequence of digital video signals and associated priority signals relating to respective images;
   selecting digital video signals representing two or more iamges at one selector stage and transmitting the selected digital video signals to a further selector stage, said selection being dependent upon the priority signals associated with said respective images; and
   combining said selected digital video signals transmitted to a last selector stage to produce a sequence of output video signals.

8. A system comprising:
   video sources providing respective video signals representing respective images and priority signals for said images;
   selector stages arranged in a series in which each selector stage receives as its inputs (i) video signals and priority signals provided by a respective video source and (ii) video signals and priority signals provided as outputs of a preceding selector stage, if any, in the series, and provides as its outputs a subset of more than one of said inputs, selected on the basis of the priority signals received as said inputs; and
   a network for combining the video signals provided as outputs by the last selector stage in the series to thereby produce video signals representing a combined image.

9. A system as in claim 8 including sources of key signals for the video signals received as inputs by the selector stages, wherein said each selector stage provides as an output the key signals for the video signals comprising at least one of said outputs, and wherein said combining network combines video signals representing at least two images in a manner controlled by said key signals provided as an output of the last selector stage in said series.

10. A system as in claim 9 in which the selected stage is the last stage of the series.

11. A system as in claim 10 in which said combining network forms said combined image by combining the video signals representing one image, as weighted by said key signals as provided as an output of said last selector stage, and the video signals representing another image, as weighted by the inverse of said last mentioned key signals.

12. A system as in claim 9 in which said key signals for each of said video image comprise a respective pixel key signal for each pixel of the image designating the proportion of the pixel value to be used in forming said combined image.

13. A system as in claim 12 in which each pixel key signal can range in value fron zero to unity.

* * * * *